(No Model.)
M. F. HARLEY.
BAKING PAN.
No. 457,775. Patented Aug. 18, 1891.
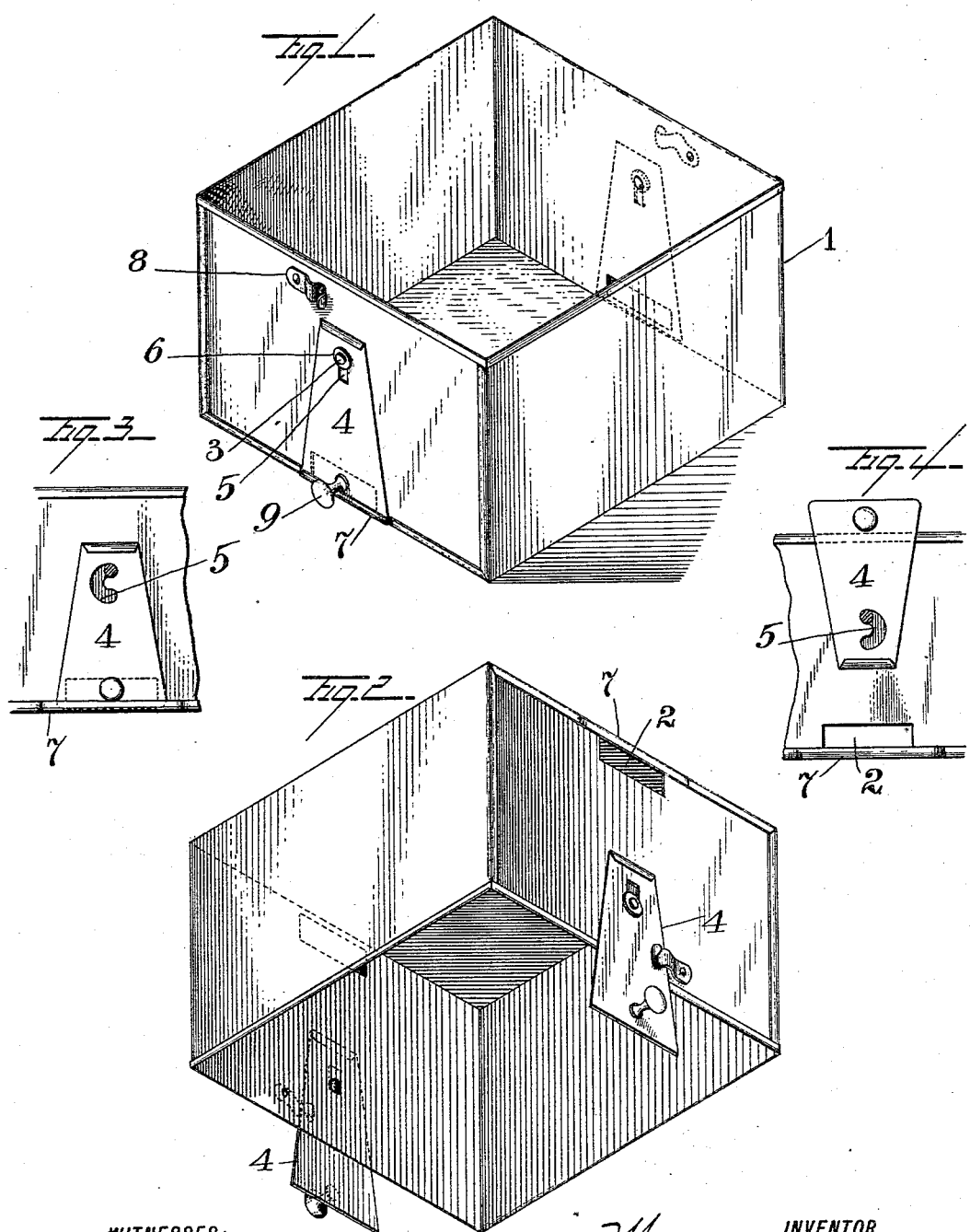
WITNESSES:
INVENTOR
Millard F. Harley
BY
John Holley Jr
his ATTORNEY.
THE NORRIS PETERS CO., PHOTO-LITHO., WASHINGTON, D. C.

UNITED STATES PATENT OFFICE.

MILLARD F. HARLEY, OF PHILADELPHIA, PENNSYLVANIA.

BAKING-PAN.

SPECIFICATION forming part of Letters Patent No. 457,775, dated August 18, 1891.

Application filed November 14, 1890. Serial No. 371,474. (No model.)

*To all whom it may concern:*

Be it known that I, MILLARD F. HARLEY, a citizen of the United States, residing in the city and county of Philadelphia, in the State of Pennsylvania, have invented certain new and useful Improvements in Baking-Pans, of which the following is a specification, reference being had to the accompanying drawings, forming part hereof.

My invention relates, generally, to that class of pans employed especially in the baking of bread, cakes, and the like, and in which slots or openings are formed in the pan-body near the pan-bottom to permit of the insertion of a suitable implement between the bottom of the pan and its contents to free or loosen the latter from the pan and so dispense with the use of grease commonly employed to prevent the contents of the pan adhering thereto and ofttimes employed to the detriment of the flavor of the article baked, and relates especially to the combination, with a pan of such construction, of a cover or covers pivotally attached to the pan-body and of such construction as to be adapted, first, to close the slots to prevent the escape of the contents of the pan; secondly, to be locked or retained in a reverse position to form rests for and rigidly support the pan in an inverted position above a common level to permit a free circulation of air about the pan on all sides for the cooling of the contents of the pan and at the same time uncover or expose the said slots in the pan-body to facilitate the cooling of the pan contents; thirdly, forming handles for the carrying of the pan, and, lastly, providing a pan embodying such improvements that will occupy a space in the oven of no greater height than the actual depth of the pan itself; and to such end it consists of the novel features of construction, combination, and operation of parts hereinafter described and claimed.

Referring to the drawings, Figure 1 is a perspective view of a pan embodying my invention, showing the parts in position for use in baking. Fig. 2 is a perspective view of an inverted pan embodying my invention, showing the covers reversed and retained or locked in position to form rests for supporting the pan in such inverted position in a manner to permit a free circulation of air about the pan on all sides for the cooling of its contents; also, the slots in the pan-body then uncovered or exposed to facilitate such cooling. Figs. 3 and 4 are detail views showing a modified form of slot in the cover for its operation.

In the drawings, the parts being represented by numerals, the numeral 1 indicates a pan, which may be of any desired configuration of outline, and 2 the slots in the body thereof for the purpose recited; 3, the fixed pivots or pins, which are located in the pan-body above an imaginary central line taken transversely with regard to the depth of the pan, for a purpose as will presently appear.

4 are what I term the "covers." These covers are slotted near their upper extremity, as at 5, and mounted on the pivots 3, the pivots working in said slots 5, rings or washers 6 being shown employed to retain the covers 4 on the pivots 3 and in close contact with the pan-body 1; but means other than shown may be adopted to the same end. These covers are of size in length to reach, and sufficient in breadth at their lower extremity to entirely cover the slots 2 in the pan-body, the rim 7 of the pan forming the lower side of the slot 2, effecting a close joint with the lower extremity of the cover 4.

Suitable keepers or stops 8 are located on the pan-body near the top thereof, for a purpose presently explained, and the covers 4 are provided with knobs 9, whereby they may be operated, and also at times to act as handles to a certain extent to carry the pan.

The slots 5 in the covers 4 permit the raising of the covers free of the rim 7 of the pan, so that they may be turned out of their position shown in Fig. 1 and into a reverse position, as shown in Fig. 2, and also limit the vertical movement of the covers on the pivots or pins when acting as rests. Thus, when the pan is inverted and rested on the covers, which have previously been caused to assume the reverse position, as shown in Fig. 2, and act as rests for supporting the pan in such inverted position above a common level for the rapid cooling of the contents of the pan, it will be apparent that the covers (then rests) will move or slide on the pivots or pins the extent of their respective slots, and the pivots or pins then occupy a position in the slots, Fig. 2, the reverse of their former position, Fig. 1, and act as stops, with the slots, against further vertical movement of the covers, (rests.) It will be understood that the location of the fixed pivots or pins, the length of the covers, and the extent of their respective slots will govern the elevation and support of an inverted pan above its common level to permit of a free circulation of air about the pan on all sides. It will be further understood that in reversing the position of the covers to form rests the slots in the pan-body will be uncovered and exposed, thus facilitating the cooling of the contents of the pan.

When the covers are reversed in position to act as rests, as described, the keepers or stops 8, which are located on the pan-body near the upper edge and adjacent to said covers or rests, engage the latter when a position at right angles with the pan has been attained and retain them against further movement. These keepers or stops 8 are also oppositely located relative to the rests on opposite sides of the pan, and, as will be obvious, serve to prevent the falling of the pan out of its inverted position.

The knobs 9 on the covers 4 provide a ready means of manipulating the covers into and out of position, either as covers for the slots in the pan-body or as rests for supporting the pan in an inverted position, as described, and at times serve, also, to a certain extent as handles for the carrying of the pan.

Having thus described my invention, I wish it to be understood that I do not limit myself to the precise construction and arrangement of devices as shown in my drawings, but may vary the same in any manner to better carry out the principle of my invention without departing from the true scope thereof.

I claim—

1. The combination, with a baking-pan having one or more slots in its body near the pan-bottom for the purposes described, of a cover or covers pivotally attached to the pan-body above an imaginary central line and adapted to close said slots or caused to assume a reverse position and act as handles or as rests to support the pan when the latter is inverted, for the purposes set forth.

2. The combination, with a baking-pan having one or more slots in its body near the pan-bottom for the purposes described, of a cover or covers pivotally attached to the pan-body above an imaginary central line and adapted to close said slots or be caused to assume a reverse position and act as handles or as rests to support the pan when the latter is inverted, and suitable stop or stops on said pan-body adjacent to said cover to limit the movement thereof, substantially as described, and for the purposes set forth.

3. The combination, with a baking-pan having one or more slots in its body near the pan-bottom, of a cover for each slot adapted to close said slots and provided with a slot near its upper extremity, a fixed pivot or pin in the body of the pan above an imaginary central line and above said slot in the pan-body and working in the slot in the cover, whereby said covers may be caused to assume a reverse position and act as handles or form rests to support the pan when the latter is inverted, and a knob or the like on said cover to operate the same, as described, and for the purposes set forth.

4. The combination, with a baking-pan having one or more slots in its body near the pan-bottom, of a cover for each slot adapted to close said slot and provided with a slot near its upper extremity, a fixed pivot or pin in the body of the pan above an imaginary central line and above said slot in the pan-body and working in the slot in the cover, a keeper, stop, or the like on said pan-body near its upper edge adapted to engage said cover when reversed to form rests, as described, and a knob or the like on said cover to operate the same, as and for the purposes set forth.

In testimony whereof I have hereunto signed my name this 9th day of May, A. D. 1890.

MILLARD F. HARLEY.

In presence of—
HENRY K. CHEW, Jr.,
JOHN JOLLEY, Jr.